(12) United States Patent
Pham

(10) Patent No.: US 8,953,430 B2
(45) Date of Patent: Feb. 10, 2015

(54) INSERTION OF DOWNLINK DEMODULATION REFERENCE SIGNALS INTO OFDM FRAMES

(75) Inventor: Duong Pham, Victoria (AU)

(73) Assignee: NEC Corporation, Tokyo (JP)

( * ) Notice: Subject to any disclaimer, the term of this patent is extended or adjusted under 35 U.S.C. 154(b) by 576 days.

(21) Appl. No.: 13/138,642

(22) PCT Filed: Feb. 26, 2010

(86) PCT No.: PCT/JP2010/053598
§ 371 (c)(1),
(2), (4) Date: Sep. 14, 2011

(87) PCT Pub. No.: WO2010/106923
PCT Pub. Date: Sep. 23, 2010

(65) Prior Publication Data
US 2012/0002746 A1 Jan. 5, 2012

(30) Foreign Application Priority Data

Mar. 19, 2009 (AU) ................................ 2009901193

(51) Int. Cl.
*H04J 11/00* (2006.01)
*H04L 5/02* (2006.01)
*H04L 5/00* (2006.01)
*H04J 1/14* (2006.01)

(52) U.S. Cl.
CPC ............... *H04L 5/023* (2013.01); *H04L 5/001* (2013.01); *H04J 1/14* (2013.01)
USPC ........................................ 370/207; 370/496

(58) Field of Classification Search
None
See application file for complete search history.

(56) References Cited

U.S. PATENT DOCUMENTS

| 2009/0046800 A1* | 2/2009 | Xu et al. ........................ 375/267 |
| 2009/0268910 A1* | 10/2009 | Liu et al. ........................ 380/268 |
| 2010/0190486 A1 | 7/2010 | Kimura et al. |

FOREIGN PATENT DOCUMENTS

WO WO 2008/149533 A1 12/2008

OTHER PUBLICATIONS

Nortel, "Design Aspect for Higher-order MIMO in LTE-advanced", R1-090144, 3GPP, Jan. 2009.*
International Search Report (ISR) dated Apr. 6, 2010.
NEC Group, "Downlink Demodulation RS design for LTE-A", R1-091222, 3GPP, Mar. 2009, Figs. 1-4 <URL:http://www.3gpp.org/ftp/tsg_ran/WGI_RL1/TSGR1_56b/Docs/R1-091222.zip>.

(Continued)

*Primary Examiner* — Khoa Huynh
(74) *Attorney, Agent, or Firm* — McGinn IP Law Group, PLLC

(57) ABSTRACT

A method of inserting downlink demodulation Reference Signals into Resource Blocks of slots within Orthogonal Frequency Division Multiplexing (OFDM) frames at an OFDM transmitter forming part of an OFDM system, the transmitter having at least one antenna and the system having at least one transmission layer, includes the steps of: for each antenna, inserting cell-specific Reference Signals at sub-carriers indices evenly spaced by a fixed sub-carrier spacing; and selectively inserting UE-specific Reference Signals into nodes of a rectangular lattice formed from unused Resource Elements in a group of Resource Blocks of two consecutive slots, the nodes being located at the same sub-carrier indices as the cell-specific Reference Signals and further being equally spaced by a fixed number of symbol indices within the group of Resource Blocks.

24 Claims, 12 Drawing Sheets

5-LAYER CASE, EXTENDED CP

(56) References Cited

OTHER PUBLICATIONS

LG Electronics, "Downlink Reference Signal for Higher Order MIMO", R1-090218, 3GPP, Jan. 2009, Fig 4 <URL:http://www.3gpp.org/ftp/tsg_ran/WGI_RL1/TSGR1_55b/Docs/R1-090218.zip>.

NTT Docomo, "DL RS Design for LTE-Advanced", R1-091483, 3GPP, Mar. 2009, Figs. 1,5,6 <URL:http://www.3gpp.org/ftp/tsg_ran/WGI_RL1/TSGR1_56b/Docs/R1-091483.zip>.

Nortel, "Design Aspect for Higher-order MIMO in LTE-advanced", R1-090144, 3GPP, Jan. 2009, Fig. 4 <URL:http://www.3gpp.org/ftp/tsg_ran/WGI_RL1/TSGR1_55b/Docs/R1-090144.zip>.

Samsung, "DL RS Designs for Higher Order MIMO", R1-090619, 3GPP, Feb. 2009, Fig. 3(b) <URL:http://www.3gpp.org/ftp/tsg_ran/WGI_RL1/TSGR1_56/Docs/R1-090619.zip>.

\* cited by examiner

1-LAYER CASE, NORMAL CP

2-LAYER CASE, NORMAL CP

1-LAYER CASE, EXTENDED CP

2-LAYER CASE, EXTENDED CP

3-LAYER CASE, NORMAL CP

4-LAYER CASE, NORMAL CP

FIG. 11

| | | | | | | | | | | | |
|---|---|---|---|---|---|---|---|---|---|---|---|
| $R_1$ | $R_3$ | $P_2$ | $R_0$ | | | $R_1$ | $R_2$ | $P_1$ | $R_0$ | | $P_3$ |
| | | | | | | | | | | | |
| | | | | | | | | | | | |
| $R_0$ | $R_2$ | $P_1$ | $R_1$ | | $P_3$ | $R_0$ | $R_3$ | $P_2$ | $R_1$ | | |
| | | | | | | | | | | | |
| | | | | | | | | | | | |
| $R_1$ | $R_3$ | $P_2$ | $R_0$ | | | $R_1$ | $R_2$ | $P_1$ | $R_0$ | | $P_3$ |
| | | | | | | | | | | | |
| | | | | | | | | | | | |
| $R_0$ | $R_2$ | $P_1$ | $R_1$ | | $P_3$ | $R_0$ | $R_3$ | $P_2$ | $R_1$ | | |

$l=0$      |      $l=5$   $l=0$      |      $l=5$
← EVEN-NUMBERED SLOTS → ← ODD-NUMBERED SLOTS →

3-LAYER CASE, EXTENDED CP

FIG. 12

| | | | | | | | | | | | |
|---|---|---|---|---|---|---|---|---|---|---|---|
| $R_1$ | $R_3$ | $P_2$ | $R_0$ | | $P_4$ | $R_1$ | $R_2$ | $P_1$ | $R_0$ | | $P_3$ |
| | | | | | | | | | | | |
| | | | | | | | | | | | |
| $R_0$ | $R_2$ | $P_1$ | $R_1$ | | $P_3$ | $R_0$ | $R_3$ | $P_2$ | $R_1$ | | $P_4$ |
| | | | | | | | | | | | |
| | | | | | | | | | | | |
| $R_1$ | $R_3$ | $P_2$ | $R_0$ | | $P_4$ | $R_1$ | $R_2$ | $P_1$ | $R_0$ | | $P_3$ |
| | | | | | | | | | | | |
| | | | | | | | | | | | |
| $R_0$ | $R_2$ | $P_1$ | $R_1$ | | $P_3$ | $R_0$ | $R_3$ | $P_2$ | $R_1$ | | $P_4$ |

$l=0$      |      $l=5$   $l=0$      |      $l=5$
← EVEN-NUMBERED SLOTS → ← ODD-NUMBERED SLOTS →

4-LAYER CASE, EXTENDED CP

5-LAYER CASE, NORMAL CP

6-LAYER CASE, NORMAL CP

5-LAYER CASE, EXTENDED CP

6-LAYER CASE, EXTENDED CP

FIG. 17

7-LAYER CASE, NORMAL CP

FIG. 18

8-LAYER CASE, NORMAL CP

7-LAYER CASE, EXTENDED CP

8-LAYER CASE, EXTENDED CP

1-LAYER CASE, EXTENDED CP

8-LAYER CASE, EXTENDED CP

INSERTION OF DOWNLINK DEMODULATION REFERENCE SIGNALS INTO OFDM FRAMES

TECHNICAL FIELD

The present invention relates generally to Orthogonal Frequency Division Multiplexing (OFDM) communication systems, and in particular to the mapping of downlink demodulation Reference Signals into radio frames transmitted within such systems.

Priority is claimed on Australian Provisional Patent Application No. 2009901193, filed Mar. 19, 2009, the content of which is incorporated herein by reference.

BACKGROUND ART

In OFDM communication systems, users are allocated a specific number of sub-carriers for a predetermined amount of time. These are referred to as physical Resource Blocks and have both a time and frequency dimension. In contrast to packet-oriented networks, OFDM communication systems do not employ a pre-amble to facilitate carrier offset estimates, channel estimation, timing synchronization, etc. Instead, special Reference Signals are embedded in the physical Resource Blocks. A specified Reference Signal is assigned to each cell within an OFDM network and acts as a cell-specific identifier. These Reference Signals are used by User Equipment (UE) to determine the channel impulse response from each transmitting antenna.

In addition to the above-referenced cell-specific Reference Signals, UE-specific Reference Signal has been proposed by the third generation partnership project (3GPP) standards organization. These proposed UE-specific Reference Signals are transmitted only in scheduled Resource Blocks. Selected Reference Signals can be associated with different spatial multiplexing channels, or layers, within Multiple Input/Multiple Output (MIMO) OFDM communication systems. Different layers can target the same or different user equipment in the OFDM communication system.

FIG. 1 depicts a simplified OFDM communication system 10 including a base station/eNodeB 12 communicating to user equipment 14 via a MIMO communication channel 16. FIG. 2 depicts selected elements of the base station 12, whereas FIG. 3 depicts selected elements of the UE 14. As seen in FIG. 2, a demodulation Reference Signal is generated by a Reference Signal generator 16 and pre-coded by a pre-coder 18 according to the number of layers, or spatial multiplexing channels, between the base station 12 and the UE 14. A time frequency mapper acts to map the pre-coded Reference Signals into Resource Blocks for transmission to UE 14. As the Reference Signals and other data are pre-coded with the same pre-coder matrix, the base station 12 does not have to inform the UE 14 which pre-coder matrix was used.

As seen in FIG. 3, at the UE 14, a time-frequency de-mapper 22 de-maps the Reference Signals from the transmitted Resource Blocks and a channel estimator 24 then estimates the effective channel, that is the product of the channel itself and the pre-coder matrix for demodulation of the data by a data demodulator 26. Different numbers of layers lead to different pre-coder matrix sizes and hence a different number of antenna ports, there being one antenna port per layer.

The mathematical derivation of a pre-coded Reference Signal design will now be described.

Assume that the maximum number of transmit antennas is 8 and let:

r denote the number of layers (or transmission rank);
$d(f_n, t_n)$ denote the data vector of length r, at the subcarrier $f_n$, OFDM symbol $t_n$;
$y(f_n, t_n)$ denote the received data vector of length up to 8, at the subcarrier $f_n$, OFDM symbol $t_n$ (received signal at receive antennas);
$H(f_n, t_n)$ denote the channel matrix of size up to 8×8, at the subcarrier $f_n$, OFDM symbol $t_n$; and
W denote the precoder matrix of size 8×r.

Then the received signal, transmitted data and channel relates to each other (in the absence of noise) as follows:

$$\underset{8\times 1}{y}(f_n, t_n) = \underset{8\times 8}{H}(f_n, t_n) \times \underset{8\times r}{W} \times \underset{r\times 1}{d}(f_n, t_n)$$

$$\underset{8\times 1}{y}(f_n, t_n) = \underset{8\times r}{A}(f_n, t_n) \times \underset{r\times 1}{d}(f_n, t_n)$$

In order to recover the data $d(f_n, t_n)$ from the received signal $y(f_n, t_n)$, the UE needs to estimate the channel matrix $A(f_n, t_n)$.

Let $P(f_n, t_n)$ denote a demodulation reference signal (DRS) vector of length r at the sub-carrier $f_n$, OFDM symbol $t_n$, then we have $$\underset{8\times 1}{z}(f_n, t_n) = \underset{8\times r}{A}(f_n, t_n) \times \underset{r\times 1}{p}(f_n, t_n)$$

Consider one element of $z(f_n, t_n)$, say $z_1(f_n, t_n)$, i.e. the signal at the first receive antenna. Then we have:

$$z_1(f_n, t_n) = A_{11}(f_n, t_n)p_1(f_n, t_n) + A_{12}(f_n, t_n)p_2(f_n, t_n) + \ldots + A_{1r}(f_n, t_n)p_r(f_n, t_n)$$

To solve for the unknowns $A_{11}(f_n, t_n), A_{12}(f_n, t_n), \ldots, A_{1r}(f_n, t_n)$ we need at least r equations.

A solution is to assume the channel is the same for a number of sub-carriers, $f_1, f_2, \ldots, f_r$, and a number of OFDM symbol $t_1, t_2, \ldots, t_r$ and denote just by A.

Consider the system of linear equations:

$$z_1(f_1, t_1) = A_{11}p_1(f_1, t_1) + A_{12}p_2(f_1, t_1) + \ldots + A_{1r}p_r(f_1, t_1)$$

$$z_1(f_2, t_2) = A_{11}p_1(f_2, t_2) + A_{12}p_2(f_2, t_2) + \ldots + A_{1r}p_r(f_2, t_2)$$

$$\ldots$$

$$z_1(f_r, t_r) = A_{11}p_1(f_r, t_r) + A_{12}p_2(f_r, t_r) + \ldots + A_{1r}p_r(f_r, t_r)$$

This system of equations can also be written as:

$$\begin{bmatrix} z_1(f_1, t_1) \\ z_1(f_2, t_2) \\ \vdots \\ z_1(f_r, t_r) \end{bmatrix} = \begin{bmatrix} p_1(f_1, t_1) & p_2(f_1, t_1) & \cdots & p_r(f_1, t_1) \\ p_1(f_2, t_2) & p_2(f_2, t_2) & \cdots & p_r(f_2, t_2) \\ \vdots & \vdots & \vdots & \vdots \\ p_1(f_r, t_r) & p_2(f_r, t_r) & \cdots & p_r(f_r, t_r) \end{bmatrix} \times \begin{bmatrix} A_{11} \\ A_{12} \\ \vdots \\ A_{1r} \end{bmatrix}.$$

By doing similarly for other receive antennas, then we have $$\begin{bmatrix} z_m(f_1, t_1) \\ z_m(f_2, t_2) \\ \vdots \\ z_m(f_r, t_r) \end{bmatrix} = \underbrace{\begin{bmatrix} p_1(f_1, t_1) & p_2(f_1, t_1) & \cdots & p_r(f_1, t_1) \\ p_1(f_2, t_2) & p_2(f_2, t_2) & \cdots & p_r(f_2, t_2) \\ \vdots & \vdots & \vdots & \vdots \\ p_1(f_r, t_r) & p_2(f_r, t_r) & \cdots & p_r(f_r, t_r) \end{bmatrix}}_{P} \times \begin{bmatrix} A_{m1} \\ A_{m2} \\ \vdots \\ A_{mr} \end{bmatrix},$$

$$m = 1, \ldots, 8$$

Given the matrix P of DRS sequences and $z_m(f_n, t_n)$, m=1, ..., 8, n=1, ..., r, we can derive A.

It is required that DRSs on different layers are mutually orthogonal. This means P needs to satisfy:

$$P^H P = \alpha I$$

The natural and also best solution to this requirement is to design $$P = \lambda I, \alpha = |\lambda|_2, \text{i.e.}$$

$$P = \begin{bmatrix} p_1(f_1, t_1) & 0 & \cdots & 0 \\ 0 & p_2(f_2, t_2) & \cdots & 0 \\ \vdots & \vdots & \ddots & \vdots \\ 0 & 0 & \cdots & p_r(f_r, t_r) \end{bmatrix}$$

Note: it is not necessary that $t_1 \neq t_2 \neq \ldots \neq t_r$.

This solution is the generalization of the UE specific reference signal in LTE Release-8. In that particular case, W is just a column vector and P is just a scalar.

This solution is the generalization of the cell specific reference signals for 2 transmit antennas in LTE Release-8. In that particular case, W=I and $t_1=t_2$, $p_1(f_1, t_1)=R_0$, $p_2(f_2, t_2)=R_1$.

This solution can also be the generalization of the cell specific reference signals for 4 transmit antennas in LTE Release-8. In that particular case, W=I, $t_1=t_2$, $t_3=t_4$, $p_1(f_1, t_1)=R_0$, $p_2(f_2, t_2)=R_1$, $p_3(f_3, t_3)=R_2$ and $p_4(f_4, t_4)=R_3$.

It is required that the design principle is an extension of the concept of the LTE Release-8 UE-specific reference signal (used for beam forming) to multiple layers, the reference signal sequence, i.e. value of $p_n(f_n, t_n)$, should be generated in the same way as that of the LTE Release-8 UE specific reference signals.

There exists a need to allocate elements of P into each Resource Block for different number of layers r.

DISCLOSURE OF INVENTION

With this in mind, one aspect of the invention provides a method of inserting downlink demodulation Reference Signals into Resource Blocks of slots within Orthogonal Frequency Division Multiplexing (OFDM) frames at an OFDM transmitter forming part of an OFDM system, the transmitter having at least one antenna and the system having at least one transmission layer, the method including the steps of:

for each antenna, inserting cell-specific Reference Signals at sub-carrier indices which are evenly spaced by a fixed sub-carrier spacing; and selectively inserting UE-specific Reference Signals into nodes of a rectangular lattice formed from unused Resource Elements in a group of Resource Blocks of two consecutive slots, the nodes being located at the same sub-carrier indices as the cell-specific Reference Signals and further being equally spaced by a fixed number of symbols within the group of Resource Blocks.

Preferably, the UE-specific Reference Signals are selectively inserted by:

spacing UE-specific Reference Signals for a same layer and a same symbol index by twice the fixed sub-carrier spacing; and spacing UE-specific Reference Signals for a same layer and a same sub-carrier by twice the fixed symbol spacing.

Preferably, the fixed symbol spacing equals three symbols. The fixed sub-carrier spacing preferably equals three sub-carriers.

For systems using one or two transmission layers, eight UE-specific Reference Signals are preferably inserted per layer. For each layer, the UE-specific Reference Signals are preferably inserted at four symbol indices.

For systems using three or four transmission layers, four UE-specific Reference Signals are preferably inserted per layer. For systems using five transmission layers, four UE-specific Reference Signals are preferably inserted for three of the layers and two UE-specific Reference Signals are preferably inserted for the other two layers. For systems using six transmission layers, four UE-specific Reference Signals are preferably inserted for two of the layers and two UE-specific Reference Signals are preferably inserted for the other four layers.

For systems using seven transmission layers, four UE-specific Reference Signals are preferably inserted for one of the layers and two UE-specific Reference Signals are preferably inserted for the other six layers.

For systems using eight transmission layers, two UE-specific Reference Signals are preferably inserted for each layer.

For systems using three to eight layers, the UE-specific Reference Signals are preferably inserted, for each layer, at two symbol indices.

Preferably, the UE-specific Reference Signals are selectively inserted so as to maximize the spacing from each other in the lattice.

The slots may be configured to include either a normal cyclic prefix or an extended cyclic prefix.

Another aspect of the invention provides a transmitter forming part of an OFDM system, the transmitter including a time-frequency mapper configured to carry out a method of inserting downlink demodulation Reference Signals as described here above.

BRIEF DESCRIPTION OF THE DRAWINGS

Other aspects and features of the invention will become apparent to those of ordinary skill in the art upon review of the following description of specific embodiments of the invention in conjunction with the accompanying drawings:

FIGS. 5 to 20 represent different Reference Signal allocation patterns in situations where anywhere from 1 to 8 transmission layers are used and where both normal and extended cyclic prefixes are used;

EXEMPLARY EMBODIMENT FOR CARRYING OUT THE INVENTION

Figure 1:
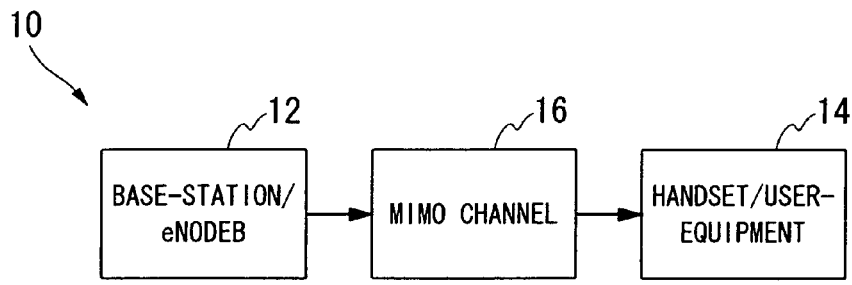
FIG. 1 is a schematic diagram illustrating elements of an OFDM communication system.
Figure 2:
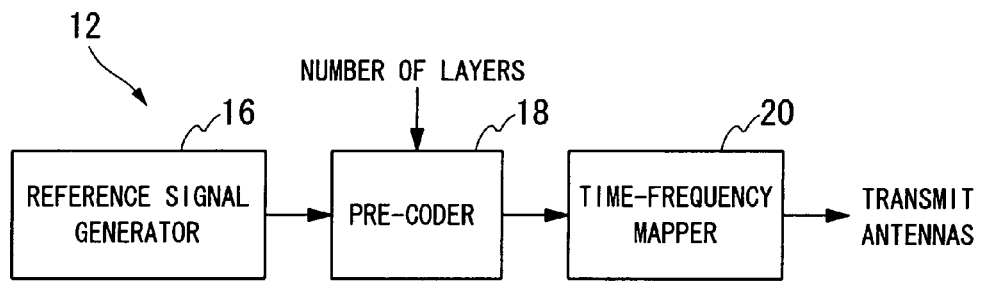
FIG. 2 is a schematic diagram illustrating selected elements of a base station forming part of the system of FIG. 1.
Figure 3:
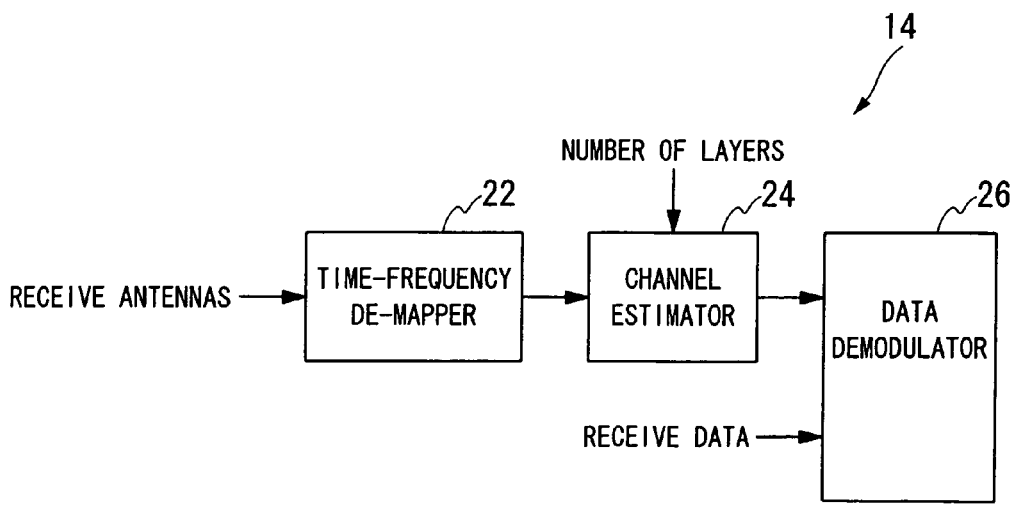
FIG. 3 is a schematic diagram of selected elements of User Equipment forming part of the system of FIG. 1.
Figure 4:
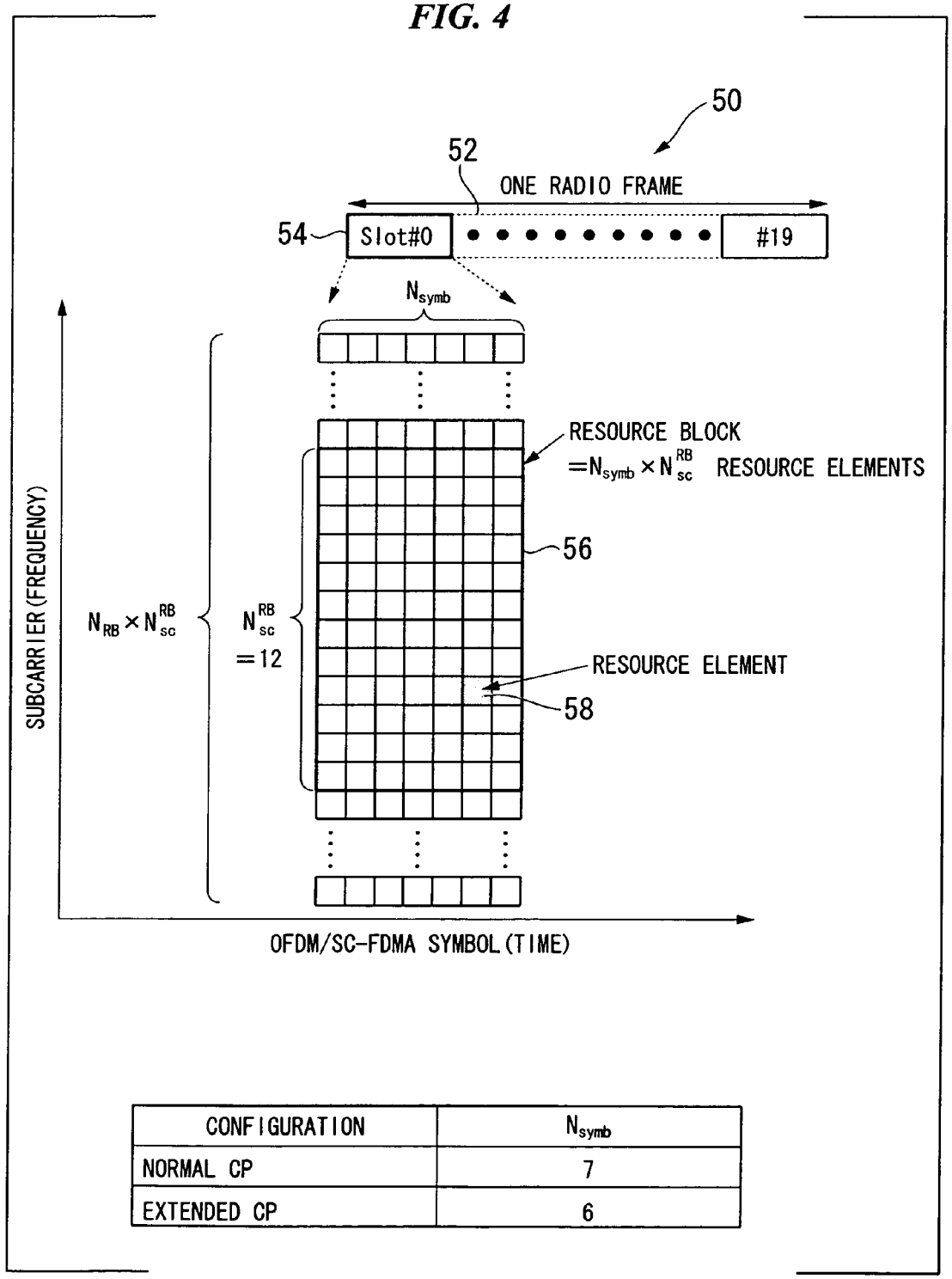
FIG. 4 is a schematic diagram illustrating a Resource Block used to transmit Reference Signals and data via the system of FIG. 1.
Figure 5:
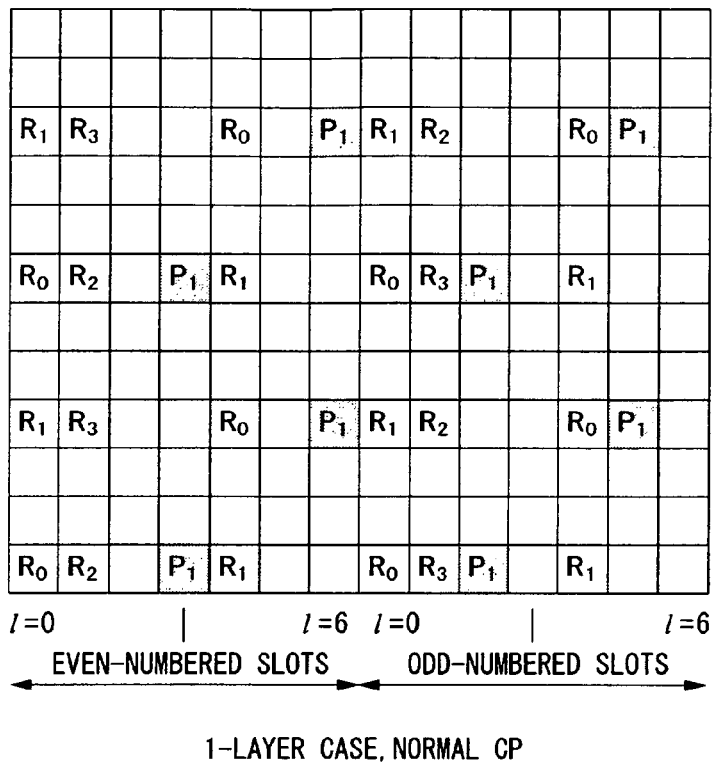
Figure 6:
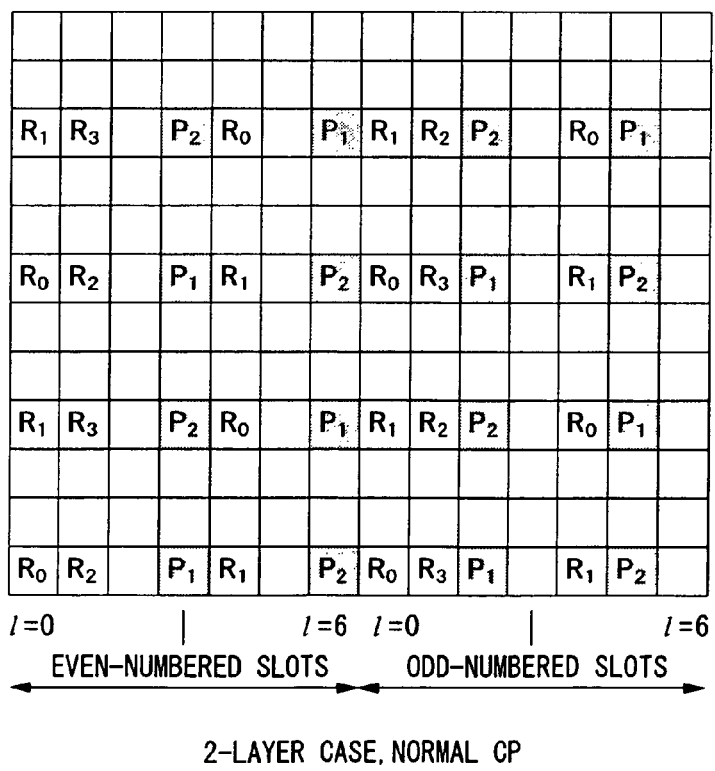
Figure 7:
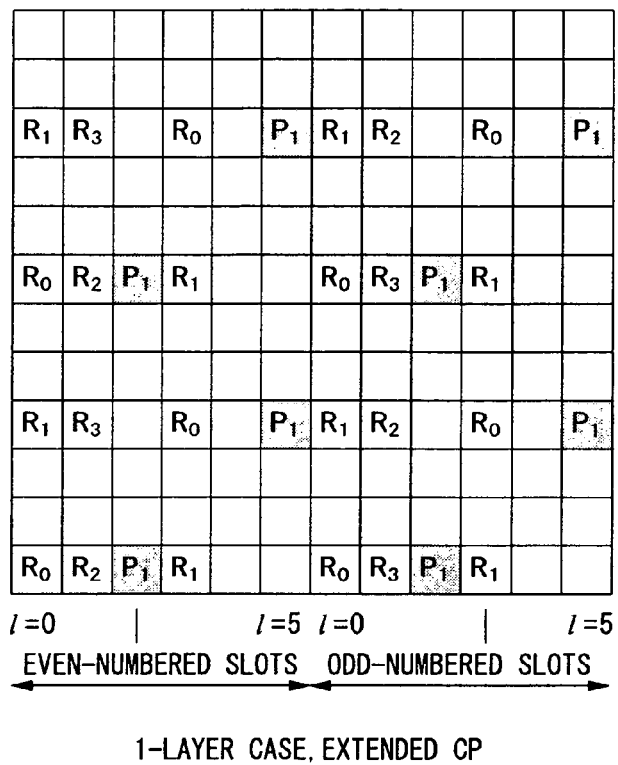
Figure 8:
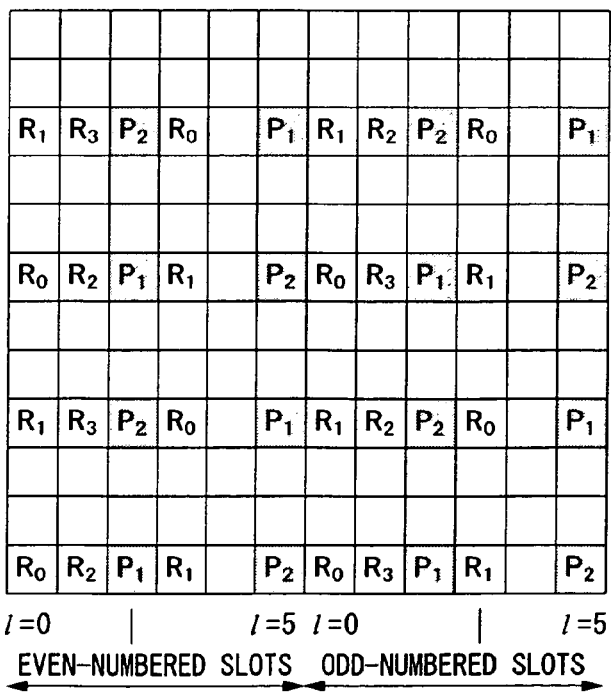

Referring now to FIG. 4, there is depicted a generic radio frame structure for the transmission of Reference Signals and data by the system 10. As shown in this figure, a radio frame 52 is divided into ten sub-frames, each sub-frame being further divided into two slots. Each slot, such as that referenced 54 consists of either six or seven OFDM symbols, depending on whether a normal or extended cyclic prefix is employed. The total number of available sub-carriers depends on the overall transmission bandwidth of the system 10.

Long term evolution (LIE) specifications developed by the 3GPP define parameters for system bandwidths from 1.25 MHz to 20 MHz. A Physical Resource Block (PRB) is defined as consisting of twelve consecutive sub-carriers for one slot in duration. The transmitted downlink signal consists of $N_{SC}^{RB}$ sub-carriers for a duration of $N_{symb}$ OFDM symbols. This can be represented by a Resource Block 56. Each box within the block represents a single sub-carrier for one symbol period, and is referred to as a Resource Element, such as that referenced 58. In MIMO applications, there is a Resource Grid for each transmitting antenna.

Cell-specific Reference Signals are embedded in the PBR's, as shown in FIGS. 5 to 20. In each of these figures, cell-specific Reference Signals R0 to R3 are depicted and correspond to a MIMO system with four transmitting antennas. Reference Signals from antenna 0 are shown as R0, Reference Signals from antenna 1 are shown as R1, Reference Signals from antenna 2 are shown as R2 and Reference Signals from antenna 3 are shown as R3. Reference Signals from each transmitting antenna are transmitted sequentially to enable UE's to compute channel responses for this exemplary or antenna MIMO system. It can be seen from FIGS. 5 to 20 that the cell-specific Reference Signals from transmit antenna 0 and from transmit antenna 1 are transmitted during the first and fifth OFDM symbols of each slot when a normal cyclic prefix is used and during the first and fourth OFDM symbols when an extended cyclic prefix is used. It will also be noted that Reference Signals are transmitted every sixth sub-carrier, and that Reference Signals are staggered in both time and frequency.

Figure 21:
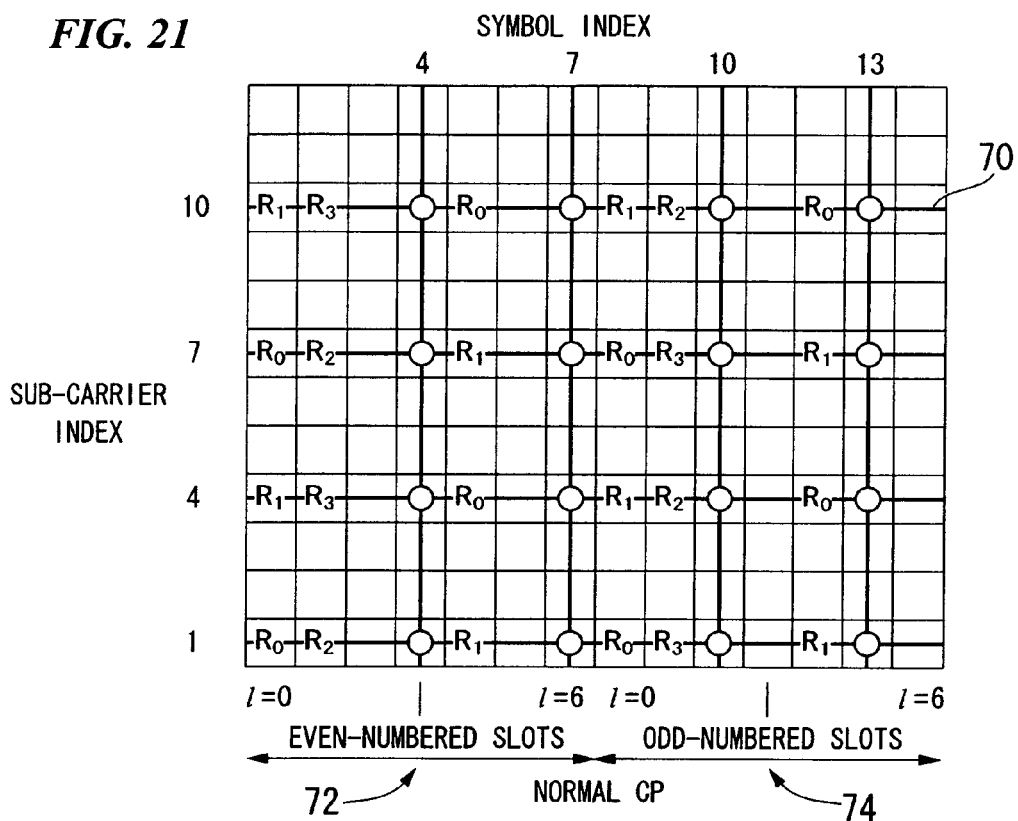
FIGS. 21 and 22 depict nodes of a rectangular lattice formed from unused Resource Elements in a group of Resource Blocks of two consecutive slots, the UE-specific Reference Signals being mapped onto the depicted nodes.
Figure 22:
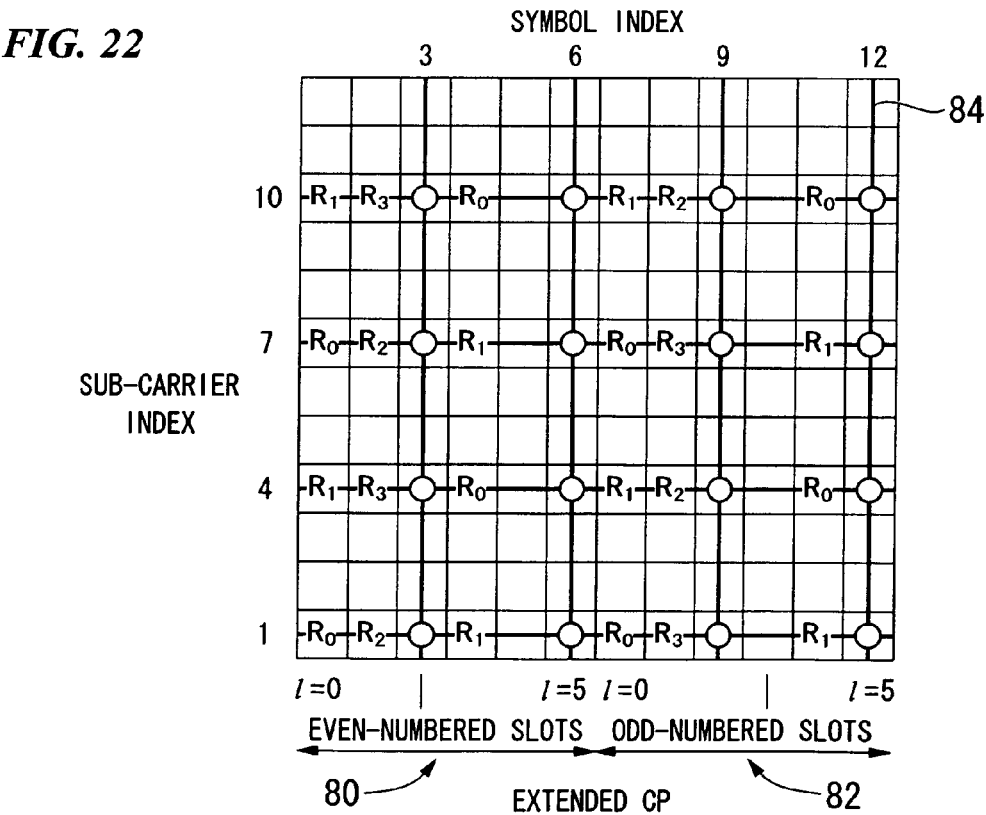

As shown in FIGS. 21 and 22, UE-specific Reference Signals are selectively inserted into nodes of a rectangular lattice formed from unused resource elements in a group of Resource Blocks of two consecutive slots. In FIG. 21, a normal cyclic prefix is used and accordingly each Resource Block includes seven symbols transmitted across 12 sub-carriers. Nodes (represented by white circles) of a rectangular lattice 70 represent possible locations at which UE-specific Reference Signals can be inserted into a group of Resource Blocks 72 and 74 of two consecutive slots, where Resource Block 72 corresponds to an even numbered slot, and Resource Block 74 corresponds to an odd numbered slot. It can be seen from FIG. 21 that the nodes are located at the same sub-carrier indices as the cell-specific Reference Signals $R_0$ to $R_3$, namely at sub-carrier indices 1, 4, 7 and 10.

It can be seen from FIG. 21 that the nodes of the rectangular lattice 70 are located at the same sub-carrier indices as the cell-specific Reference Signals $R_0$ to $R_3$ but at different OFDM symbol indices in the group of Resource Blocks 72 and 74. FIG. 21 depicts a sub-carrier index for each of the 12 sub-carriers forming part of the Resource Block 72 and 74. In this case, the sub-carrier indices of the cell-specific Reference Signals are 1, 4, 7 and 10.

Moreover, it can be seen from FIG. 21 that the nodes of the rectangular lattice 70 are equally spaced by a fixed number of symbol indices within the group of Resource Blocks 72 and 74. In this case, the nodes are equally spaced by three symbol indices, or in other words the nodes are located at symbols having a symbol index of 4, 7, 10 and 13 within the group of Resource Blocks 72 and 74 (In other words, the nodes are located at symbols having a symbol index of 1=3 and 1=6 of the even-numbered slot and 1=2 and 1=5 of the odd-numbered slot). In this example, a normal cyclic prefix is used and accordingly the two Resource Blocks 72 and 74 include seven symbols each.

By contrast FIG. 22 depicts a situation in which extended cyclic prefixes are used, and accordingly Resource Blocks 80 and 82 include only six symbols each. In this figure, a rectangular lattice 84 is depicted which includes nodes once again formed from unused Resource Elements in the group of Resource Blocks 80 and 82 of two consecutive slots. The nodes are once again located at the same sub-carrier indices as the cell-specific Reference Signals, namely at sub-carrier indices 1, 4, 7 and 10, but at different OFDM symbol indices. The nodes are also equally spaced by a fixed number of symbol indices within the group of Resource Blocks. In this case the spacing equals three symbol indices, so that the nodes are located at symbol indices 3, 6, 9 and 12 (In other words, the nodes are located at symbols having a symbol index of 1=2 and 1=5 of each slot).

Figure 23:
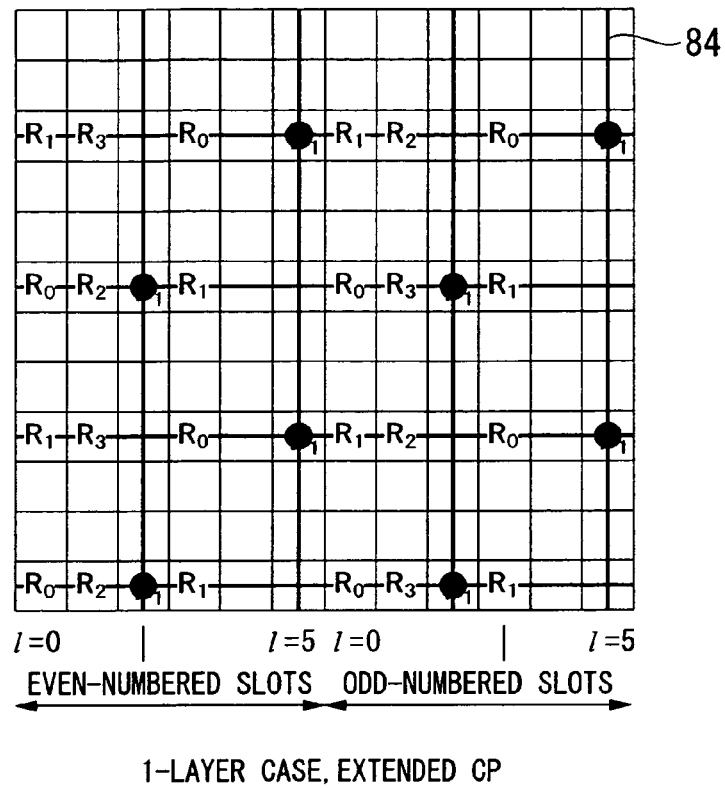
FIGS. 23 and 24 illustrate two examples of the mapping of UE-specific Reference Signals onto nodes of the rectangular lattices shown in FIGS. 21 and 22.

FIG. 23 depicts one example of the manner in which nodes of the rectangular lattice 84 are partially populated with UE-specific Reference Signals, in the case of a single layer system where an extended cyclic prefix is used. In this example, UE-specific Reference Signals for a single layer are inserted into every second node. It can be seen that the Reference Signals are inserted into the nodes (depicted by the black colored circles) so that the Reference Signals at a same symbol index are spaced by twice the fixed sub-carrier spacing shown in FIGS. 21 and 22. In other words, UE-specific Reference Signals sharing a same symbol index are spaced by six sub-carrier indices. Moreover, the UE-specific Reference Signals sharing a same sub-carrier index are spaced by twice the fixed symbol spacing in this case by six symbol indices. It can also be seen that UE-specific Reference Signals are selectively inserted so as to maximize spacing from each other in the lattice. Accordingly, no two adjacent nodes in the rectangular lattice 84 are populated with UE-specific Reference Signals.

Figure 24:
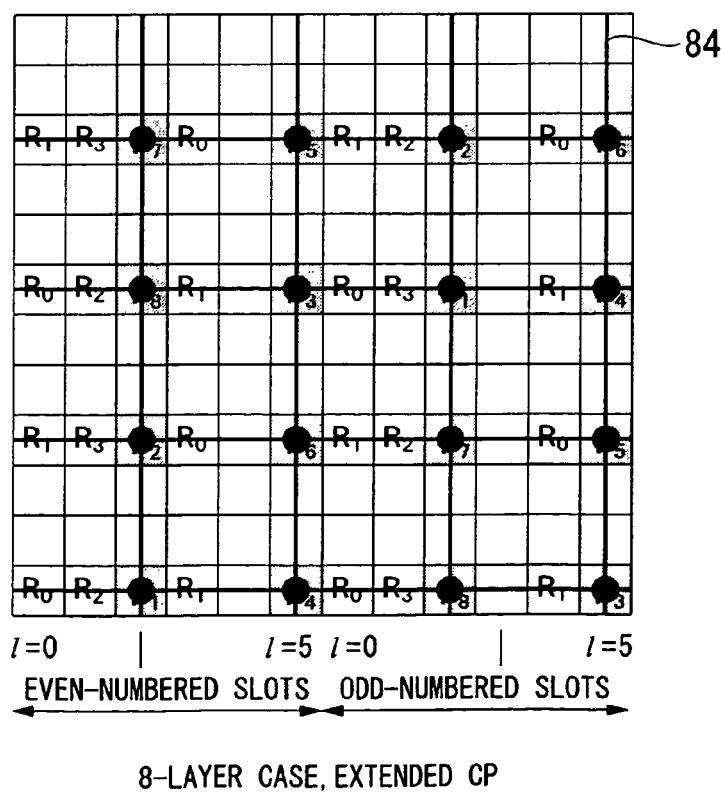

By contrast, FIG. 24 depicts a scenario in which the MIMO OFDM communication system includes eight layers and uses an extended cyclic prefix. In this case, all nodes of the rectangular lattice 84 are populated with UE-specific Reference Signals.

FIGS. 5 to 8 depict Reference Signal mapping schemes in MIMO OFDM systems using one or two transmission layers. In all cases, eight UE-specific Reference Signals are inserted for each layer. In the mappings shown in FIGS. 5 and 7, all Reference Signals are denoted "$P_1$". In the mappings depicted in FIGS. 6 and 8, two layers are used and the UE-specific Reference Signals are denoted "$P_1$" and "$P_2$" for each of the two layers. From FIGS. 5 to 8 it can be seen that the UE-specific Reference Signals for each layer are inserted at four symbol indices, or in other words, at four different symbols in the group of Resource Blocks depicted in these figures. Two Reference Signals are inserted for each layer in each symbol.

Figure 9:
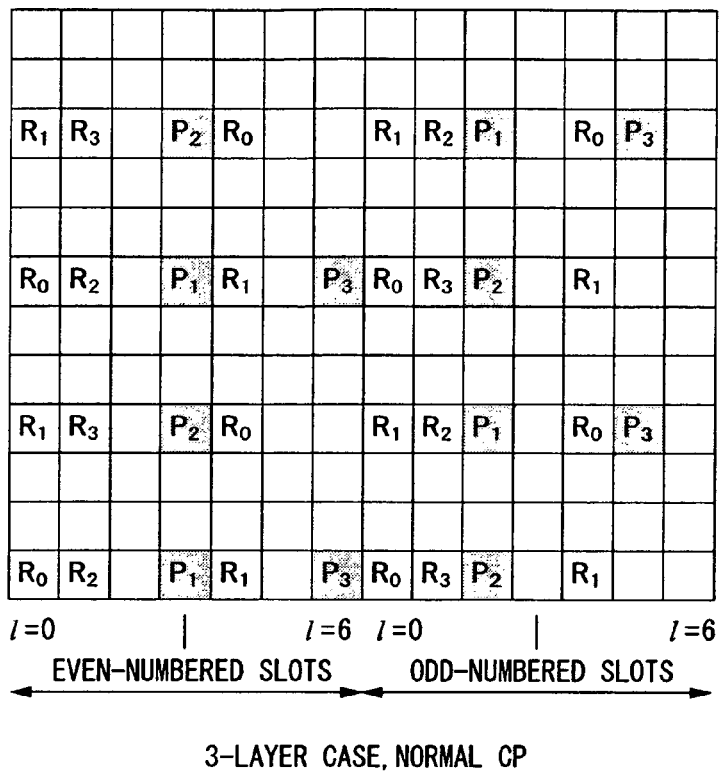
Figure 10:
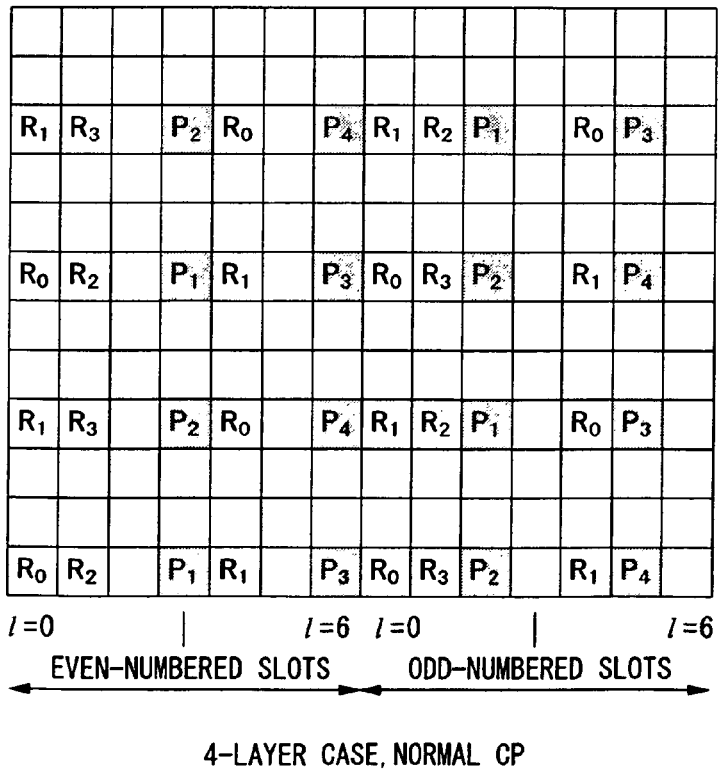

FIGS. 9 to 12 depict Reference Signal mappings in systems in which three or four layers are used. FIGS. 9 and 10 depict the case where a normal cyclic prefix is used, whilst FIGS. 11 and 12 depict a case where an extended cyclic prefix is used. It can be seen that the mapping scheme for these systems is similar to that depicted in FIGS. 5 to 8, except that the number of UE-specific Reference Signals of each layer inserted into the group of Resource Blocks depicted in these figures is now four instead of eight. Moreover, the number of symbol indices used to transmit UE-specific Reference Signals for each layer is now two instead of four.

Figure 13:
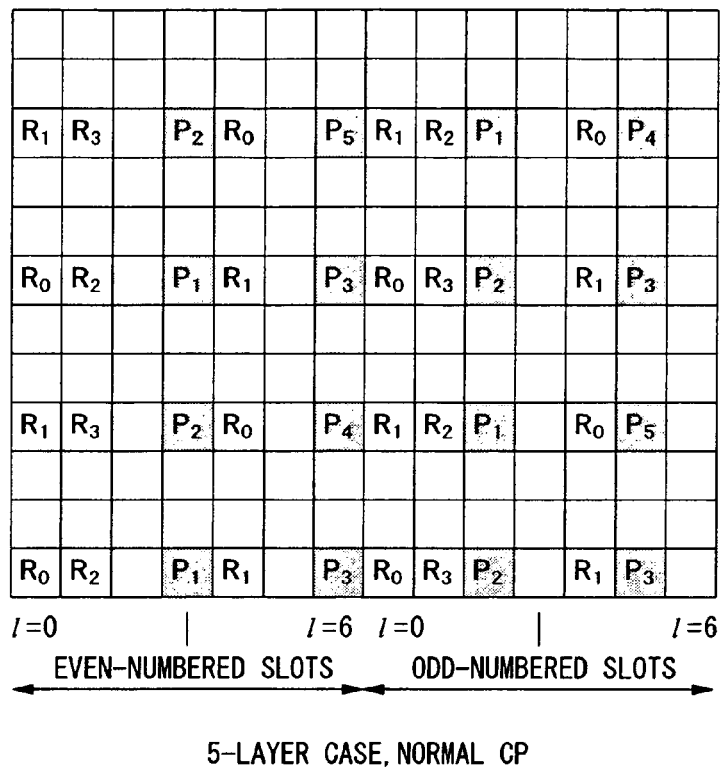
Figure 15:
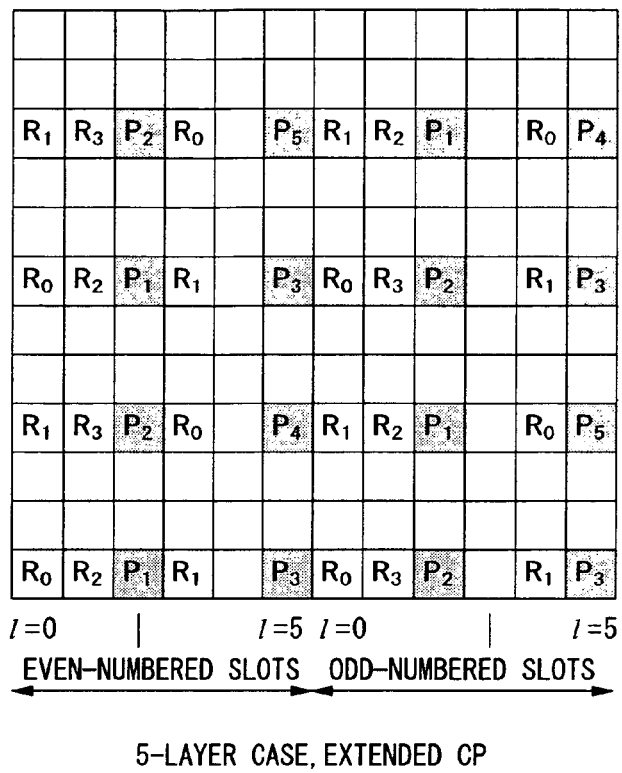

FIGS. 13 and 15 depict a mapping scheme in which five layers are used and in which a normal cyclic prefix is used (FIG. 13) and an extended cyclic prefix is used (FIG. 15). In both figures, four UE-specific Reference Signals are inserted for three of the layers and two UE-specific Reference Signals are inserted for the remaining two layers. In all cases, two symbol indices are used to transmit the UE-specific Reference Signals for each layer.

Figure 14:
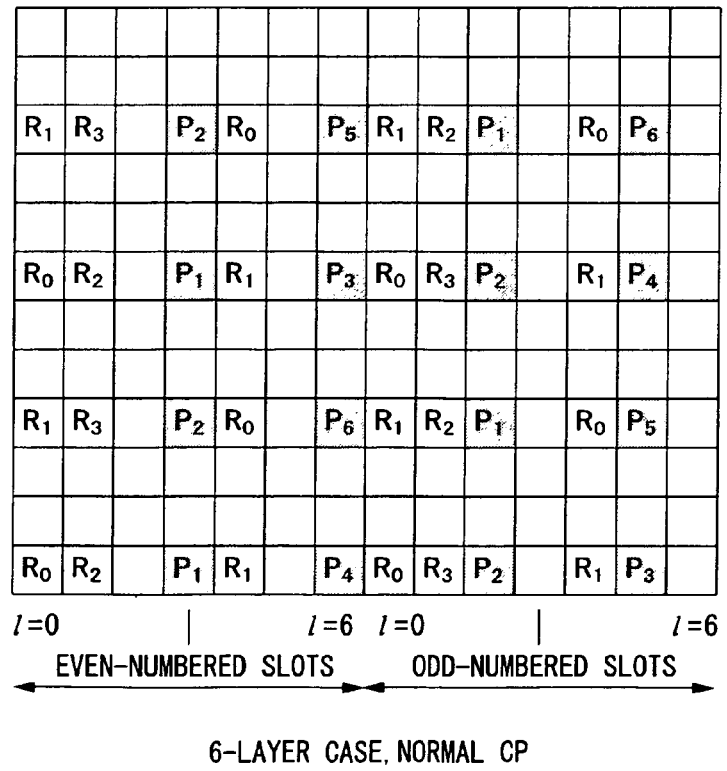
Figure 16:
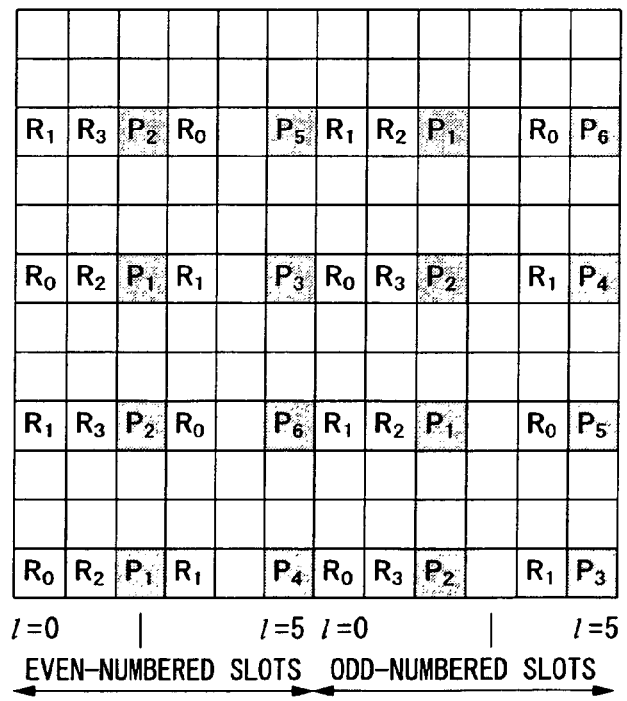

FIGS. 14 and 16 respectively depict situations in which a sixth layer, normal cyclic prefix is used and a sixth layer, extended cyclic prefix is used. In this case, four UE-specific Reference Signals are inserted for two of the six layers and two UE-specific Reference Signals are inserted for the other four layers. Again, for each layer the UE-specific Reference Signals are inserted at two symbol indices.

Figures 17, 18:
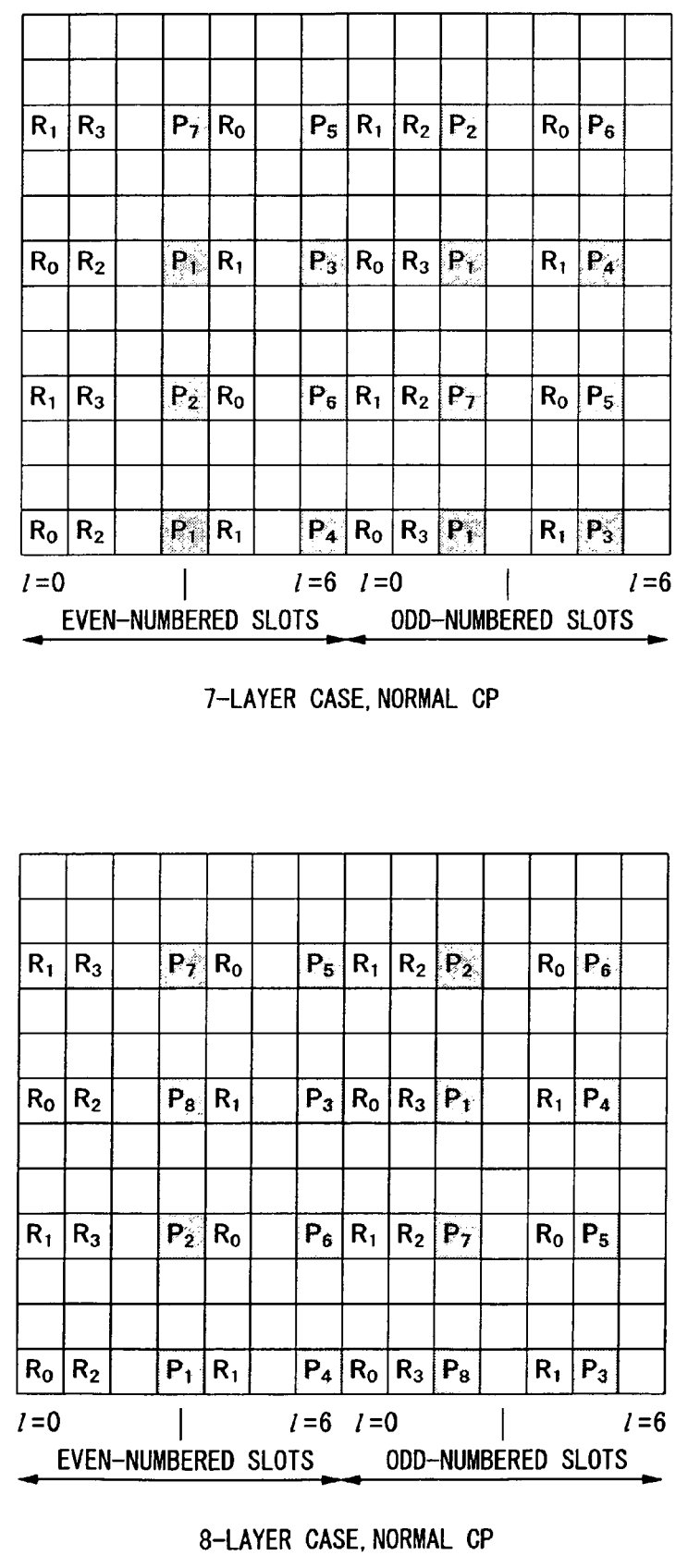
Figure 19:
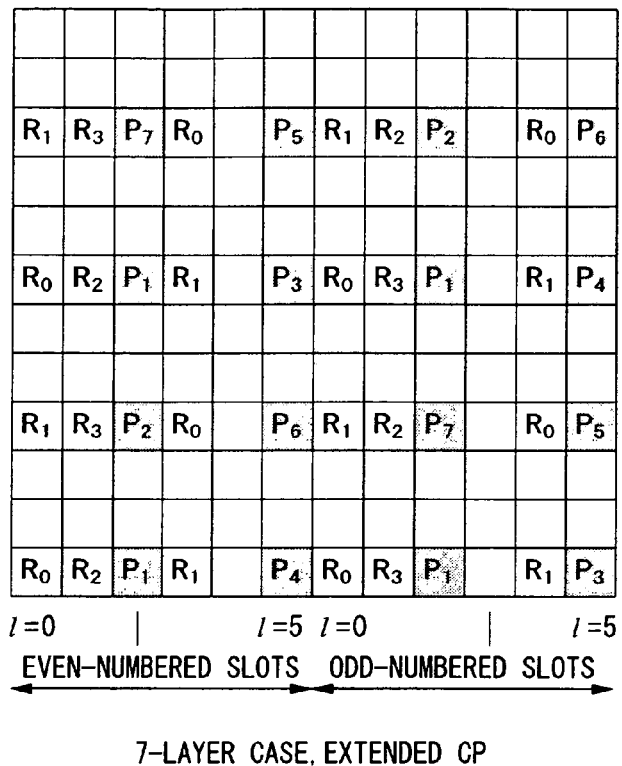

FIGS. 17 and 19 depict a system in which seven layers are used together with a normal cyclic prefix (FIG. 17) and an extended cyclic prefix (FIG. 19). As can be seen in these figures, four UE-specific Reference Signals are inserted for one of the layers whilst two UE-specific Reference Signals are inserted for the other six layers. Once again, for each layer the UE-specific Reference Signals are inserted at two symbol indices.

Figure 20:
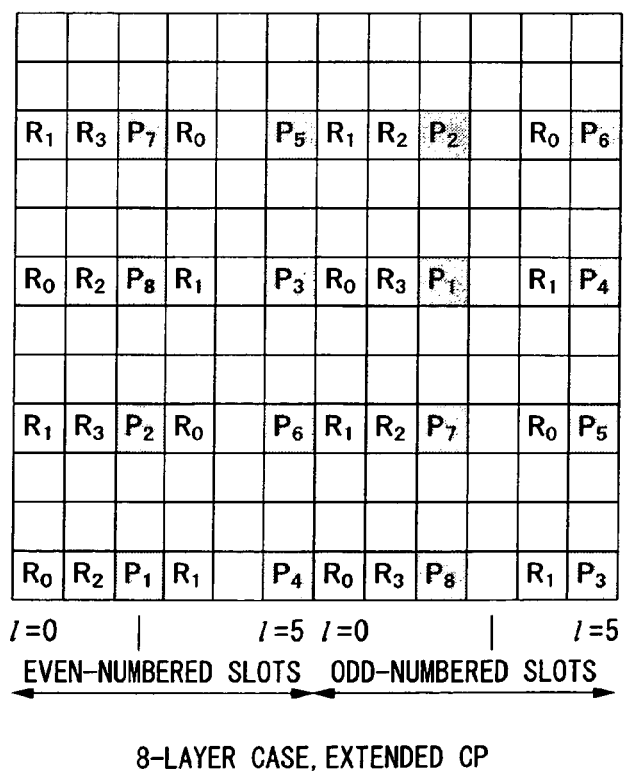

Finally, FIGS. 18 and 20 depict mapping schemes in which eight layers are used together with a normal cyclic prefix (FIG. 18) and an extended cyclic prefix (FIG. 20). In this case, two UE-specific Reference Signals are inserted for each layer, and two symbol indices are used to transmit the UE-specific Reference Signals for each layer.

In all cases, the UE-specific Reference Signals are selectively inserted so as to maximize the spacing from each other in the lattice 70 or 84.

The above-described method of inserting downlink demodulation Reference Signals into Resource Blocks of slots within OFDM frames provides a number of advantages, and in particular requires only a small overhead, enables good channel estimation and is simple to implement.

Firstly, the maximum total number of UE specific Reference Signals in the above-described examples is fixed to 16. However, as the more layers are utilized the fewer UE specific Reference Signals are allocated to each layer. The Applicant has determined that it is desirable that the density of UE specific Reference Signals (number of Reference Signals per layer) within a resource block decreases with increasing number of transmission layers. This is because the channel condition for lower-order MIMO transmission is generally poorer than that for higher-order MIMO transmission and hence would require more UE specific Reference Signals to improve channel estimation performance. This consideration enables system overhead to be minimized.

Good channel estimate interpolation, i.e. good channel estimate and thus good accuracy of data demodulation at the UE, is enabled by a number of features, notably:

a. The UE specific Reference Signal location has a regular structure (rectangular lattice);

b. The lattice has as large size as it can and covers all corners of the group of resource blocks;

c. The UE specific Reference Signals (of the same layer) have maximum spacings within the lattice and equally allocated between slots.

It can also be seen that the same structure is adopted for normal CP and extended CP, thereby facilitating ease of implementation.

Furthermore, the multiplexing method for UE specific Reference Signals of layers here is frequency division multiplexing (FDM) and time division multiplexing (TDM). This is preferable to Code Division Multiplexing (COM) as channel estimation of COM could deteriorate if UE mobility is high or if the channel is frequency dispersive.

The foregoing embodiments are merely illustrative of the application of the principles of the invention. Other arrangements and methods can be implemented by those skilled in the art without departing from the scope of the present invention.

INDUSTRIAL APPLICABILITY

The present invention can be applied to Orthogonal Frequency Division Multiplexing (OFDM) communication systems, and in particular to the mapping of downlink demodulation Reference Signals into radio frames transmitted within such systems.

The invention claimed is:

1. A method of inserting downlink demodulation Reference Signals into Resource Blocks of slots within Orthogonal Frequency Division Multiplexing (OFDM) frames at an OFDM transmitter forming part of an OFDM system, the transmitter having at least one antenna and the system having at least one transmission layer, the method including:
   for each antenna, inserting cell-specific Reference Signals at sub-carriers indices evenly spaced by a fixed sub-carrier spacing; and
   selectively inserting UE-specific Reference Signals into nodes of a rectangular lattice formed from unused Resource Elements in a group of Resource Blocks of two consecutive slots, the nodes being located at the same sub-carrier indices as the cell-specific Reference Signals and further being equally spaced by a fixed number of symbol indices within the group of Resource Blocks,
   wherein for systems using 5 transmission layers, the selectively inserting UE-specific Reference Signals comprises inserting 4 UE-specific Reference Signals for three of the layers and 2 UE-specific Reference Signals for the other two layers.

2. A method according to claim 1, wherein the UE-specific Reference Signals are selectively inserted by:
   spacing UE-specific Reference Signals for a same layer and a same symbol index by twice the fixed sub-carrier spacing; and
   spacing UE-specific Reference Signals for a same layer and a same sub-carrier by twice the fixed symbol spacing.

3. A method according to claim 1, wherein the fixed symbol spacing equals 3 symbols.

4. A method according to claim 1, wherein the fixed sub-carrier spacing equals 3 sub-carriers.

5. A method according to claim 1, wherein, for each layer, the UE-specific Reference Signals are inserted at 2 symbol indices.

6. A method according to claim 1, wherein the UE-specific Reference Signals are selectively inserted so as to maximize the spacing from each other in the lattice.

7. A method according to claim 1, wherein the slots are configured to include a normal Cyclic Prefix.

8. A method according to claim 1, wherein the slots are configured to include an extended Cyclic Prefix.

9. A method of inserting downlink demodulation Reference Signals into Resource Blocks of slots within Orthogonal Frequency Division Multiplexing (OFDM) frames at an OFDM transmitter forming part of an OFDM system, the transmitter having at least one antenna and the system having at least one transmission layer, the method including:
   for each antenna, inserting cell-specific Reference Signals at sub-carriers indices evenly spaced by a fixed sub-carrier spacing; and selectively inserting UE-specific Reference Signals into nodes of a rectangular lattice formed from unused Resource Elements in a group of Resource Blocks of two consecutive slots, the nodes being located at the same sub-carrier indices as the cell-specific Reference Signals and further being equally spaced by a fixed number of symbol indices within the group of Resource Blocks, wherein for systems using 6 transmission layers, the selectively inserting UE-specific Reference Signals comprises inserting 4 UE-specific Reference Signals for two of the layers and 2 UE-specific Reference Signals for the other four layers.

10. A method according to claim 9, wherein the UE-specific Reference Signals are selectively inserted by:

spacing UE-specific Reference Signals for a same layer and a same symbol index by twice the fixed sub-carrier spacing; and spacing UE-specific Reference Signals for a same layer and a same sub-carrier by twice the fixed symbol spacing.

11. A method according to claim 9, wherein the fixed symbol spacing equals 3 symbols.

12. A method according to claim 9, wherein the fixed sub-carrier spacing equals 3 sub-carriers.

13. A method according to claim 9, wherein, for each layer, the UE-specific Reference Signals are inserted at 2 symbol indices.

14. A method according to claim 9, wherein the UE-specific Reference Signals are selectively inserted so as to maximize the spacing from each other in the lattice.

15. A method according to claim 9, wherein the slots are configured to include a normal Cyclic Prefix.

16. A method according to claim 9, wherein the slots are configured to include an extended Cyclic Prefix.

17. A method of inserting downlink demodulation Reference Signals into Resource Blocks of slots within Orthogonal Frequency Division Multiplexing (OFDM) frames at an OFDM transmitter forming part of an OFDM system, the transmitter having at least one antenna and the system having at least one transmission layer, the method including:

for each antenna, inserting cell-specific Reference Signals at sub-carriers indices evenly spaced by a fixed sub-carrier spacing; and selectively inserting UE-specific Reference Signals into nodes of a rectangular lattice formed from unused Resource Elements in a group of Resource Blocks of two consecutive slots, the nodes being located at the same sub-carrier indices as the cell-specific Reference Signals and further being equally spaced by a fixed number of symbol indices within the group of Resource Blocks, wherein for systems using 7 transmission layers, the selectively inserting UE-specific Reference Signals comprises inserting 4 UE-specific Reference Signals for one of the layers and 2 UE-specific Reference Signals for the other six layers.

18. A method according to claim 17, wherein the UE-specific Reference Signals are selectively inserted by:

spacing UE-specific Reference Signals for a same layer and a same symbol index by twice the fixed sub-carrier spacing; and spacing UE-specific Reference Signals for a same layer and a same sub-carrier by twice the fixed symbol spacing.

19. A method according to claim 17, wherein the fixed symbol spacing equals 3 symbols.

20. A method according to claim 17, wherein the fixed sub-carrier spacing equals 3 sub-carriers.

21. A method according to claim 17, wherein, for each layer, the UE-specific Reference Signals are inserted at 2 symbol indices.

22. A method according to claim 17, wherein the UE-specific Reference Signals are selectively inserted so as to maximize the spacing from each other in the lattice.

23. A method according to claim 17, wherein the slots are configured to include a normal Cyclic Prefix.

24. A method according to claim 17, wherein the slots are configured to include an extended Cyclic Prefix.

* * * * *